Nov. 7, 1939.   H. R. SLUSSER   2,178,843
DOUBLE ROW ROLLER BEARING
Filed Nov. 1, 1937
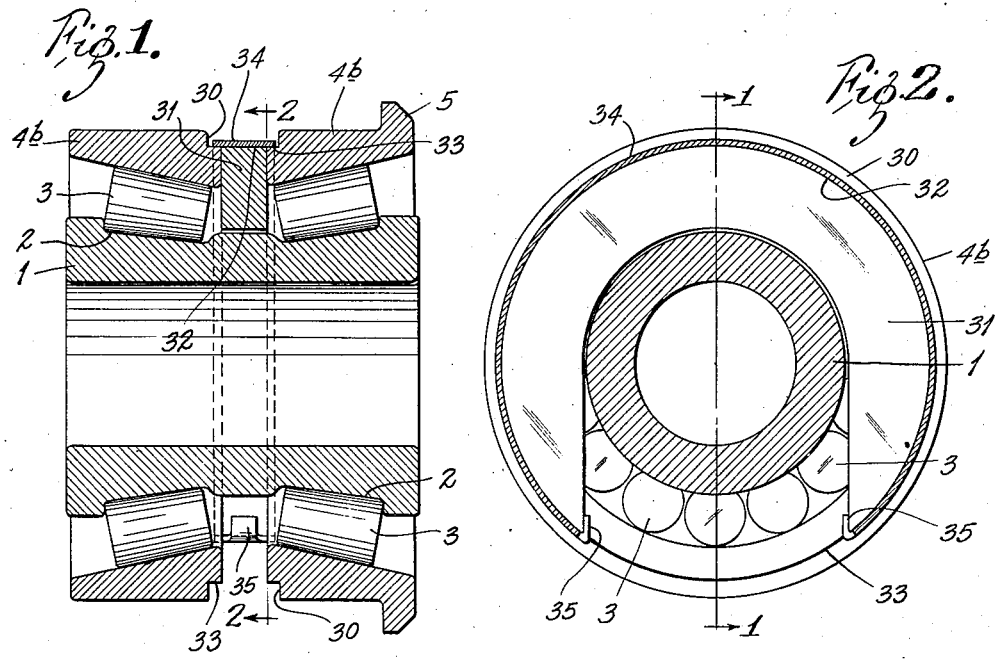
INVENTOR:
Harry R. Slusser,
by Cantlan & Gravely,
HIS ATTORNEYS.

Patented Nov. 7, 1939

2,178,843

UNITED STATES PATENT OFFICE 2,178,843

DOUBLE ROW ROLLER BEARING

Harry R. Slusser, Canton, Ohio, assignor to The Timken Roller Bearing Company, Canton, Ohio, a corporation of Ohio Application November 1, 1937, Serial No. 172,075

2 Claims. (Cl. 308—214)

My invention relates to roller bearings of the type having two series of rollers and separate outer bearing members therefor, means being provided between said outer bearing members for holding them in proper spaced running position. The invention has for its principal object a bearing of this type which is easy to assemble, in which the outer bearing members are accurately positioned and in which accidental displacement of the positioning device is prevented. A particular object of one modification is to provide for easy disassembly of the bearing.

The invention consists in the double row roller bearing and in the parts and combinations and arrangements of parts hereinafter described and claimed.

In the accompanying drawing,

Fig. 1 is a longitudinal sectional view, on the line 1—1 in Fig. 2, of a rocker arm bearing embodying my invention, and Fig. 2 is a cross-sectional view on the line 2—2 in Fig. 1.

The drawing illustrates a rocker arm bearing embodying my invention. A double inner bearing member or cone 1 has conical raceways 2 thereon that taper toward the middle of the bearing. On each raceway 2 is mounted a series of taper bearing rollers 3. A separate cup 4b or outer bearing member is provided for each series of rollers 3, one of said cups being provided with a peripheral flange 5 for mounting in a rocker arm or the like. The present invention is concerned with the means for holding the bearing cups in proper spaced running position. The outer portions of the end faces of the cups 4b are rabbeted, as at 30. A C-washer 31 is interposed between the end faces of the cups, its outer periphery 32 being substantially flush with the bottoms 33 of the rabbeted portions of the end faces. Said outer periphery extends through an arc of substantially more than a semicircle. A retaining strip 34 encircles said washer 31, overlapping the bottoms 33 of said rabbeted portions 30. The reduced end portions 35 of said strip are bent over the ends of the washer 31 to hold it in position. This arrangement provides an opening through which lubricant may pass to the bearing.

The above described construction provides a bearing wherein the proper running clearance between the parts is initially provided by the selection of the proper sized positioning and spacing member. The bearing is easy to assemble and proper running clearance is easily obtained by the selection of a proper sized spacer. The bearing can be disassembled by removing the spacing and positioning members, for purposes of inspection or repair or substitution of a different sized spacer. Obviously, numerous changes may be made without departing from the invention and I do not wish to be limited to the precise construction shown.

What I claim is:

1. A double row roller bearing comprising two annular series of rollers, a separate bearing cup for each series of rollers, said cups being disposed with their opposed ends spaced apart and the outer peripheral portions of the opposed faces of said cups being rabbeted, a C-shaped spacing and positioning member interposed between the opposed faces of said cups, the outer periphery of said spacing and positioning member being flush with the bottom portions of said rabbeted portions and extending through an arc of substantially more than a semicircle, and a flat strip extending around the outer periphery of said spacing and positioning member with its edges overlapping said rabbeted portions.

2. A double row roller bearing comprising two annular series of rollers, a separate bearing cup for each series of rollers, said cups being disposed with their opposed ends spaced apart and the outer peripheral portions of the opposed faces of said cups being rabbeted, a C-shaped spacing and positioning member interposed between the opposed faces of said cups, the outer periphery of said spacing and positioning member being flush with the bottom portions of said rabbeted portions and extending through an arc of substantially more than a semicircle, and a flat strip extending around the outer periphery of said spacing and positioning member with its edges overlapping said rabbeted portions, said strip having reduced ends bent around the ends of said C-shaped member.

HARRY R. SLUSSER.